3,322,817
AROMATIC AND ALIPHATIC ESTERS OF HYDROXY BENZOPHENONE DERIVATIVES
Albert I. Goldberg, Berkeley Heights, N.J., and Joseph Fertig, New York, N.Y., assignors to National Starch and Chemical Corporation, New York, N.Y.
No Drawing. Filed Mar. 15, 1963, Ser. No. 274,366
7 Claims. (Cl. 260—475)

This invention relates to a novel class of benzophenone derivatives, the process for their preparation, as well as the compositions resulting from their admixture with synthetic resins.

The advantageous properties of benzophenone derivatives, as regards their use as light stabilizing additives for various synthetic plastics have long been recognized by the practitioner. The ultra-violet absorbing ability of these materials has prompted further investigation leading to the synthesis of additional benzophenone compounds displaying this useful characteristic. The prior art does, in fact, note the existence of a wide variety of such derivatives. However, the great majority of these compounds are unfortunately prepared by means of procedures which necessitate a multiplicity of operations and this factor, in turn, places definite limitations on their commercial production and subsequent utilization by the plastics industry.

It is thus the prime object of this invention to provide a novel class of benzophenone derivatives which are prepared by means of a simplified route that is free of the complexities inherent in the processes which have generally been utilized for preparing benzophenone derivatives.

A further object of this invention involves the preparation of novel benzophenone derivatives characterized by their excellent ultra-violet absorbing ability.

A still further object of our invention is the admixture of our novel benzophenone derivatives with many types of synthetic resins so as to provide the resulting compositions with improved resistance to the degradative effects of ultra-violet radiation.

An additional object of our invention is the synthesis of ultra-violet stabilizing benzophenone derivatives which may also be conveniently utilized as chemical intermediates for further conversion into a variety of useful products by means of chemical reactions well known to those skilled in the art. Various other objects and advantages of this invention will become apparent from the following description thereof.

We have now discovered that novel carboxylic acid ester derivatives of $C_2$–$C_{18}$ beta-hydroxyalkoxy benzophenone ethers may be prepared by means of a direct, highly efficient procedure.

The products of our invention are the carboxylic acid ester derivatives of $C_2$–$C_{18}$ beta-hydroxyalkoxy benzophenone ethers wherein said derivatives correspond to the following:

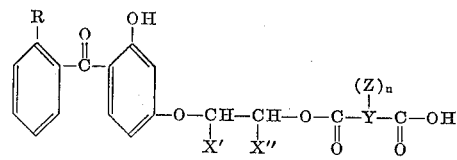

and

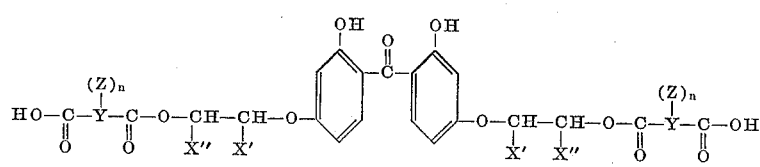

wherein Z represents a carboxy group, i.e.,

wherein $n$ represents any integer from 0 to 2 inclusive; wherein R represents a radical selected from the class consisting of hydrogen and hydroxy radicals; wherein Y represents a radical selected from the class consisting of alkylene and alkene radicals having said attached carbonyl groups, i.e.,

separated from one another by at least 2 and no more than 3 carbon atoms, and aromatic radicals having said attached carbonyl groups substituted thereon in positions which are ortho with respect to one another; and, wherein X′ and X″ are radicals selected from the class consisting of hydrogen and alkyl radicals such that the sum total of carbon atoms in the equation X′+X″+2, when applied to one hydroxyalkoxy side chain moiety, i.e.,

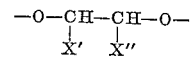

equals any integer from 2 to 18 inclusive.

Thus, these compounds may be described as the carboxylic acid ester derivatives of the $C_2$–$C_{18}$ beta-hydroxyalkoxy ethers of 2,4-dihydroxybenzophenone and 2,2′,4-trihydroxybenzophenone and as the carboxylic acid derivatives of the $C_2$–$C_{18}$ di(beta-hydroxyalkoxy) ethers of 2,2′,4,4′-tetrahydroxybenzophenone wherein said beta-hydroxyalkoxy ether side chain moieties are substituted upon the 4 or the 4 and 4′ positions of the benzophenone nucleus and wherein the alkoxy groups of said beta-hydroxyalkoxy side chain moieties may be selected from the class of alkoxy groups containing from 2 to 18 carbon atoms, i.e., ethoxy, propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy, and octadecoxy groups as well as any isomeric forms or mixtures of any of the latter alkoxy groups. Moreover, it is to be understood that the designation "beta-hydroxy" refers to the fact that the oxy oxygen atom, i.e., —O—, of the hydroxyalkoxy side chain moiety which is immediately adjacent to the carbonyl group in the above formula is always substituted upon that carbon atom of the hydroxyalkoxy side chain moiety which is in the beta position with respect to the oxygen atom of the ether linkage which connects said hydroxyalkoxy side chain moiety to the benzophenone nucleus.

In brief, the synthesis of our novel derivatives is accomplished by the reaction of the anhydride of a polycarboxylic acid with a $C_2$–$C_{18}$ beta-hydroxyalkoxy benzophenone ether. This technique has been found, surprisingly, to produce these derivatives in excellent yields, does not require the use of an organic solvent medium, and is totally devoid of any by-products. As a result, our derivatives may, if desired, be used without any need for their being subjected to any extended series of time consuming and yield reducing isolation and purification procedures.

The C$_2$–C$_{18}$ beta-hydroxyalkoxy benzophenone ethers which are applicable for use in preparing the novel derivatives of our invention are compounds corresponding to the following:

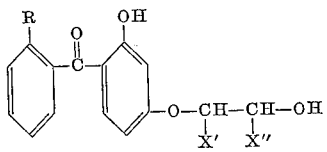

and

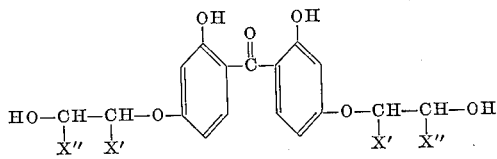

wherein R represents a radical selected from the class consisting of hydrogen and hydroxy radicals and wherein X' and X'' are radicals selected from the class consisting of hydrogen and alkyl radicals such that the sum total of carbon atoms in the equation X'+X''+2, when applied to one beta-hydroxyalkoxy side chain, i.e.

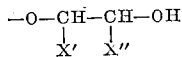

equals any integer from 2 to 18 inclusive. The designation "beta-hydroxy," as applied to the above compounds, refers to the fact that the hydroxy groups, i.e. —OH, of their hydroxyalkoxy side chains are always substituted upon that carbon atom of the hydroxyalkoxy side chain which is in the beta position with respect to the oxygen atom of the ether linkage which connects said hydroxyalkoxy side chain to the benzophenone nucleus.

These C$_2$–C$_{18}$ beta-hydroxyalkoxy benzophenone ethers are prepared by the reaction of one or more alkylene oxides, containing from 2 to 18 carbon atoms, together with a benzophenone intermediate selected from the group consisting of 2,4-dihydroxy-benzophenone; 2,2',4-trihydroxybenzophenone; and, 2,2',4,4'-tetrahydroxybenzophenone. Further details relating to the preparation of these C$_2$–C$_{18}$ beta-hydroxyalkoxy benzophenone ethers may be obtained in the copending applications, Ser. Nos. 234,533 and 234,535, both filed Oct. 31, 1962 and assigned to the assignee of the subject application, both now abandoned. It may be noted, at this point, that in preparing the carboxylic acid ester derivatives of our invention, one may also utilize those C$_2$–C$_{18}$ beta-hydroxyalkoxy benzophenone ethers corresponding to the above formulae whose benzophenone nuclei may be substituted, as for example, with low molecular weight hydrocarbon groups. Moreover, where desired, it is possible to prepare the derivatives of our invention utilizing a C$_2$–C$_{18}$ beta-hydroxyalkoxy ether of 2,2',4,4'-tetrahydroxy-benzophenone wherein the 4' position has not been substituted with a beta-hydroxyalkoxy side chain.

As for the polycarboxylic acid anhydrides which are applicable for use in our process, these may be selected from those anhydrides corresponding to the following formula:

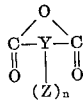

wherein Z represents a carboxy group, i.e.

wherein $n$ represents any integer from 0 to 2 inclusive; and, Y represents a radical selected from the class consisting of alkylene and alkene radicals having said attached carbonyl groups, i.e.

separated from one another by at least 2 and no more than 3 carbon atoms, and aromatic radicals having said attached carbonyl groups substituted thereon in positions which are ortho with respect to one another.

Thus, anhydrides corresponding to the above formula may be selected from the group consisting of the anhydrides of aliphatic polycarboxylic acids, such a succinic and glutaric anhydrides; the anhydrides of ethylenically unsaturated, aliphatic polycarboxylic acids, such as maleic, itaconic, and citraconic anhydrides; the anhydrides of aromatic polycarboxylic acids, such as mellitic trianhydride, mellitic dianhydride, pyromellitic anhydride, pyromellitic dianhydride, hemimellitic anhydride, trimellitic anhydride, phthalic anhydride, naphthalic anhydride, and diphenic anhydride. Any of these applicable polycarboxylic acid anhydrides may, moreover, be substituted with one or more substituent radicals such, for example, as alkyl, alkylene, halogeno, nitro, sulfo, and alkoxy radicals. It may be noted that when maleic anhydride is used in the process of our invention, the resulting derivatives may, during the course of the reaction, isomerize to the corresponding fumarate derivatives.

In general, the procedure for preparing our carboxylic acid ester derivatives of C$_2$–C$_{18}$ beta-hydroxyalkoxy benzophenone ethers begins with the introduction into a reaction vessel of both the selected polycarboxylic acid anhydride and selected C$_2$–C$_{18}$ beta-hydroxyalkoxy benzophenone ether. The resulting mixture is then heated so as to melt the reactants which are both ordinarily in the form of crystalline solids. The heating of the reaction mixture is usually conducted at temperatures in the range of about 80 to 150° C. which are maintained for periods of about 3 to 15 hours. The precise combination of time and temperature will, of course, depend upon the particular anhydride and benzophenone ether reactants which are to be utilized. It may also be noted that one may, if desired, employ a mixture of two or more polycarboxylic acid anhydrides for the reaction. In addition, the reaction may be conducted in an appropriate organic solvent medium if so desired by the practitioner. With respect to proportions, the C$_2$–C$_{18}$ beta-hydroxyalkoxy benzophenone ether and the polycarboxylic acid anhydride should preferably be present in the reaction mixture in about a 1:1 equimolar concentration.

In all cases, the desired reaction products, i.e. the carboxylic acid ester derivatives of the C$_2$–C$_{18}$ beta-hydroxyalkoxy benzophenone ethers, will, on being cooled to room temperature, be obtained in the form of viscous liquids which can be converted into crystalline solids. By means of the process of our invention they are produced in yields of about 75 to 85% of the theoretical and, as noted earlier, are devoid of any by-products and thus do not require any purification prior to their ultimate use. However, if desired, such futrher purification may be accomplished by recrystallizing the initial reaction products from an organic solvent such, for example, as benzene or methanol.

Subsequent to their preparation, the novel derivatives of our invention may have their free carboxyl groups neutralized by reaction with a suitable base which may be an alkali hydroxide such, for example, as sodium, potassium or ammonium hydroxide, or an organic amine such as ethyl amine, dibutyl amine or tripropyl amine. They are thus converted into their water soluble salts and in this form they may be conveniently blended with various aqueous solution or aqueous emulsion systems.

In utilizing the novel products of our invention, they may be combined with a wide variety of synthetic organic polymers, where compatible, so as to provide the latter with resistance to the degradative effects of ultra-violet radiation. Thus, they may be admixed, for example, with any of the homo- or copoylmers derived from such ethylenically unsaturated comonomers as styrene; alpha-methyl styrene; the acrylic and methacrylic acid esters of aliphatic alcohols such as methyl, ethyl, propyl, butyl, isobutyl, amyl, hexyl, 2-ethyl hexyl, octyl, lauryl, and stearyl alcohols; acrylic acid; isoprene; methacrylic acid; acrylamide; acrylonitrile; methacrylonitrile; vinyl propionate; dibutyl maleate; dibutyl fumarate; vinylidene chloride; vinyl chloride; vinyl acetate; ethylene; and propylene, etc.

In order to protect the latter polymers from ultra-violet radiation, our novel derivatives should be introduced in a concentration of about 0.2 to 20.0%, by weight, of the polymer. The actual blending should ordinarily occur prior to the ultimate molding, extrusion, casting, calendering or other type of forming operation to which the polymer may be subjected.

It may be noted that in addition to being blended with homo- and copolymers, the derivatives of our invention may also be used for the light stabilization of the unsaturated polyester resins resulting from the condensation of a polyhydric alcohol such as glycerol, ethylene glycol, pentaerythritol or diethylene glycol, etc., with a blend of a saturated polycarboxylic acid, such as phthalic or adipic acids, etc., and an alpha, beta-ethylenically unsaturated polycarboxylic acid, such as maleic, fumaric, or itaconic acids or any of their anhydrides. These polyester resins are ordinarily reacted subsequent to their initial preparation, with an ethylenically unsaturated, i.e. vinyl type monomer, particularly either styrene or methyl methacrylate, which is added to the polyester immediately prior to its ultimate forming or curing which takes place under the influence of heat and/or in the presence of a free radical initiating catalyst and which thereby results in the formation of a rigid, crosslinked product. In practice, the derivatives of our invention are physically blended with the polyester resin at the same time as the crosslinking vinyl monomer is introduced, i.e. immediately prior to the final forming operation, and this blending is accomplished by dissolving the derivative in the vinyl monomer which, in addition to reacting with the polyester, also serves as a solvent for the latter. By means of this procedure, our derivatives are uniformly dispersed throughout the polyester resin. For protecting such polyester resins against ultra-violet degradation, it is advisable to employ about 0.2 to 20.0%, by weight, of the polyester resin, of one of our novel derivatives.

Similar protection against ultra-violet degradation may also be provided to various other resinous materials, such as spar varnishes, alkyd resins, polyurethanes, and polycarbonates, merely by blending any of the latter with one of our novel derivatives in a manner comparable to that described above for the stabilization of unsaturated polyesters.

In addition to their being physically blended with various synthetic organic polymers in applications which take direct advantage of their ultra-violet absorbing ability, the derivatives of our invention are further characterized by their versatility as chemical intermediates. The latter property, which is unusual among light stabilizing benzophenone derivatives, is dependent upon their enhanced chemical reactivity which may, in turn, be attributed to their possessing reactive carboxyl groups. The presence of these groups thereby permits these novel benzophenone derivatives to be reacted with a wide variety of organic and inorganic reagents as well as with many polymeric materials.

For example, a particularly useful series of applications involves their inclusion, as coreactants, in the condensation reactions utilized for the preparation of polyester, polyesters, polyurethane and polycarbonate resins as well as any other resins of the type which are derived from a condensation reaction involving an alcohol containing moiety. By entering into these reactions and thereby becoming an integral part of the resin molecule, the novel derivatives of our invention thus serve to protect such resins from the degradative effects of ultra-violet radiation. Inasmuch as our derivatives are thus permanently bound into and inherently part of the resin molecule, the ultra-violet stabilization resulting from their presence cannot be lost as a result of any physical migration or solvent leaching such as may occur in the case of those resins containing ultra-violet absorbers which are introduced therein in the form of extraneous additives.

In addition to the above described applications of our novel derivatives in condensation reactions, they may also be employed as intermediates in many other types of reactions such as transesterifications, hydroxyalkylations, and vinylations.

The following examples will more clearly illustrate the embodiment of our invention. In these examples, all parts given are by weight unless otherwise noted. Moreover, where for the sake of brevity reference is made in these examples to copending applications "A" and "B," the latter designations refer, respectively, to our copending applications Ser. Numbers 234,535 and 234,533, both filed Oct. 31, 1962, and assigned to the assignee of the subject application.

*Example I*

This example illustrates the preparation of the maleic acid ester derivative of 2-hydroxy-4-(beta-hydroxyethoxy)benzophenone, i.e.

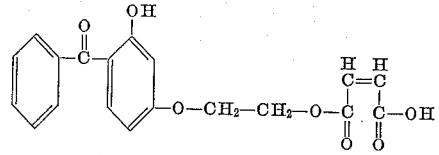

by means of the process of our invention.

Into a reaction vessel equipped with means for mechanical agitation, were charged 24.4 parts of 2-hydroxy-4-(beta-hydroxyethoxy)benzophenone, as prepared by means of the procedure described in Example I of copending application A, and 9.8 parts of maleic anhydride. This mixture of solid reactants was heated, under agitation, for 7 hours at a temperature of 95° C. during which time liquification was effected. The resulting reaction product was, however, in the form of a brown, viscous mass that slowly solidified to a pale yellow solid which, on recrystallization from a 1:1 methanol:water mixture, yielded 28.0 parts, or 82% of the theoretical yield, of the desired product which had an equivalent weight of 344 as compared to the theoretical equivalent weight of 342. Its melting point was 60° C. Examination of the infra-red spectrum of this derivative indicated that it had almost entirely isomerized to the corresponding fumaric acid isomer.

In two repetitions of the latter synthesis, 2,2'-dihydroxy-4,4'-di(beta-hydroxyethoxy)benzophenone and 2,2'-dihydroxy-4-(beta-hydroxyethoxy)benzophenone were each, in turn, substituted for the 2-hydroxy-4-(beta-hydroxyethoxy)benzophenone which was utilized in the above described procedure. The latter intermediates were prepared by means of the procedures given, respectively, in Examples II and III of copending application A. The resulting derivatives were, in each case, produced in yields which closely approximated that which was attained for the above described reaction product.

*Example II*

This example illustrates the preparation of the trimellitic acid ester derivative of 2-hydroxy-4-(beta-hydroxyethoxy)benzophenone, i.e.

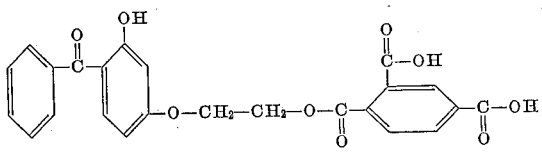

by means of the procedure of our invention.

Into a reaction vessel equipped with means for mechanical agitation, were charged 24.4 parts of 2-hydroxy-4-(beta-hydroxyethoxy)benzophenone and 19.2 parts of trimellitic anhydride. This mixture of solid reactants was heated, under agitation, for 6 hours at a temperature of 120° C. during which time liquification was effected. The resulting reaction product was, however, in the form of a brown, viscous mass that solidified to a pale yellow solid which, on recrystallization from a 1:1 acetone:water mixture, yielded 38.0 parts, or 87% of the theoretical yield, of the desired product which had an equivalent weight of 433 as compared to the theoretical equivalent weight of 436. M.P.=191° C.

In a repetition of the above procedure phthalic anhydride was substituted for trimellitic anhydride. The resulting phthalic ester derivative of 2-hydroxy-4-(beta-hydroxyethoxy) benzophenone was produced in yield which closely approached that of the trimellitic ester derivative.

Example III

This example illustrates the preparation of the succinic acid ester derivative of 2-hydroxy-4-(beta-hydroxyethoxy)benzophenone, i.e.

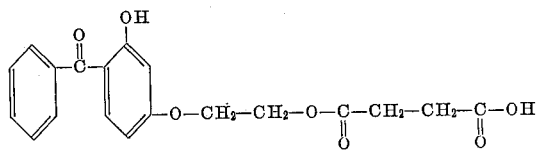

by means of the process of our invention and also illustrates the conversion of the latter product into its water soluble salts.

Into a reaction vessel equipped with means for mechanical agitation, were charged 24.4 parts of 2-hydroxy-4-(beta-hydroxyethoxy)benzophenone and 10.0 parts of succinic anhydride. This mixture of solid reactants was heated, under agitation, for 7 hours at a temperature of 120° C. during which time liquification was effected. The resulting reaction product was, however, in the form of a brown viscous mass that solidified to a pale yellow solid which, on recrystallization from a 1:1 acetone:water mixture, yielded 27.5 parts, or 80% of the theoretical yield, of the desired product which had an equivalent weight of 344, the latter figure also being the calculated theoretical weight for this material. Its melting point was 166° C.

The above described reaction product was converted into its sodium and triethylamine salts by means of a procedure wherein we first prepared two solutions each of which contained 35.8 parts of the derivative dissolved in 100 parts of acetone. To one of these solutions there was then added, dropwise, a solution of 4 parts of sodium hydroxide dissolved in 20 parts of water while, to the other solution of the derivative, there was added dropwise, a solution of 10.1 parts of triethylamine dissolved in 20 parts of acetone. In each case, the resulting salt precipitated out of solution whereupon it was recovered by filtration thereby yielding, respectively, 25 parts of the sodium salt and 31 parts of the triethyl amine salt. Each of the latter salts was completely water soluble.

Example IV

This example illustrates the preparation of the succinic acid ester derivative of 2-hydroxy-4-(beta-hydroxypropoxy)benzophenone, i.e.

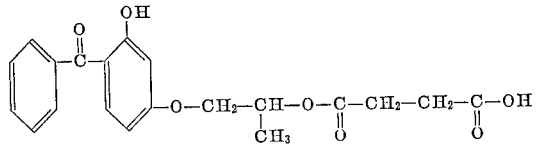

by means of the process of our invention.

Into a reaction vessel equipped with means for mechanical agitation, were charged 27.2 parts of 2-hydroxy-4-(beta-hydroxypropoxy)benzophenone, as prepared by means of the procedure given in Example I of copending application B, and 10.0 parts of succinic anhydride. This mixture of solid reactants was heated, under agitation, for 7 hours at a temperature of 140° C. during which time liquification was effected. The resulting reaction product was, however, in the form of a brown, viscous mass that solidified to a pale yellow solid which, on recrystallization from a 1:1 benzene:hexane mixture, yielded 29.0 parts, or 78% of the theoretical yield, of the desired product which had an equivalent weight of 370 as compared to the theoretical equivalent weight of 372. Its melting point was 115° C.

In a repetition of the latter synthesis, 2,2'-dihydroxy-4,4'-di(beta-hydroxypropoxy)benzophenone, as prepared by means of the procedure given in Example III of copending application B, was substituted for the 2-hydroxy-4-(beta-hydroxypropoxy)benzophenone which was utilized in the above described procedure. The resulting derivative was produced in a yield which closely approximated that which was attained for the above described reaction product.

Example V

This example illustrates the preparation of the succinic acid ester derivative of 2 - hydroxy-4-(beta-hydroxybutoxy)benzophenone, i.e.

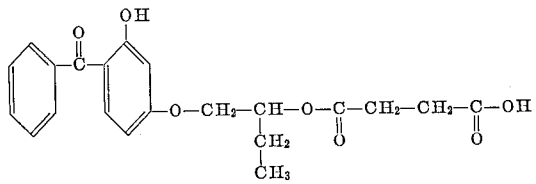

by means of the process of our invention.

Into a reaction vessel equipped with means for mechanical agitation, were charged 28.6 parts of 2-hydroxy-4-(beta-hydroxybutoxy)benzophenone, as prepared by means of the procedure given in Example V of copending application B, and 10.0 parts of succinic anhydride. This mixture of solid reactants was heated, under agitation, for 7 hours at a temperature of 140° C. during which time liquification was effected. The resulting reaction product was, however, in the form of a brown, viscous mass that solidified to a pale yellow solid which, on recrystallization from a 1:1 benzene:hexane mixture, yielded 32.5 parts, or 84% of the theoretical yield, of the desired product which had an equivalent weight of 388 as compared to the theoretical equivalent weight of 386. Its melting point was 114° C.

In a repetition of the latter synthesis, 2,2'-dihydroxy-4-(beta-hydroxybutoxy)benzophenone, as prepared by means of the procedure given in Example II of copending application B, was substituted for the 2-hydroxy-4-(beta-hydroxybutoxy)benzophenone which was utilized in the above described procedure. The resulting derivative was produced in a yield which closely approximated that which was attained for the above described reaction product.

Example VI

This example illustrates the preparation of the succinic acid ester derivative of 2-hydroxy-4-(beta-hydroxyoctoxy)benzophenone by means of the process of our invention.

Into a reaction vessel equipped with means for mechanical agitation, were charged 34.2 parts of 2-hydroxy-4-(beta-hydroxyoctoxy)benzophenone, as prepared by means of the procedure given in Example V of copending application B, and 10.0 parts of succinic anhydride. This mixture of solid reactants was heated, under agitation, for 7 hours at a temperature of 140° C. during which time liquification was effected. The resulting reaction product was, however, in the form of a brown, viscous mass which did not recrystallize and which had an equivalent weight of 438 as compared to the theoretical equivalent weight of 442.

Example VII

This example illustrates the preparation of the maleic acid ester derivative of 2-hydroxy-4-(beta-hydroxydodecoxy)benzophenone by means of the process of our invention.

Into a reaction vessel equipped with means for mechanical agitation, were charged 39.8 parts of 2-hydroxy-4-(beta-hydroxydodecoxy)benzophenone, as prepared by means of the procedure given in Example V of copending application B, and 9.8 parts of maleic anhydride. This mixture of solid reactants was heated, under agitation, for 11 hours at a temperature of 110° C. during which time liquification was effected. The resulting reaction product was, however, in the form of a brown, viscous mass that did not recrystallize and which had an equivalent weight of 487 as compared to the theoretical equivalent weight of 496.

Example VIII

This example illustrates the preparation of maleic acid ester derivative of a mixed ($C_{16}$, $C_{18}$) beta-hydroxyalkoxy benzophenone ether reaction product, i.e. a mixture of 2-hydroxy-4-(beta-hydroxyhexadecoxy)benzophenone and 2-hydroxy-4-(beta-hydroxyoctadecoxy)benzophenone, by means of the process of our invention.

Into a reaction vessel equipped with means for mechanical agitation, were charged 47.0 parts of a 60:40 2-hydroxy-4-(beta-hydroxyhexadecoxy)benzophenone: 2-hydroxy-4-(beta-hydroxyoctadecoxy)benzophenone mixture, as prepared by means of the procedure given in Example IV of copending application B, and 9.8 parts of maleic anhydride. This mixture of solid reactants was heated, under agitation, for 14 hours at a temperature of 110° C. during which time liquification was effected. The resulting reaction product was, however, in the form of a brown, viscous mass that solidified to a pale yellow solid which, on recrystallization from hexane, yielded 40 parts of a product having a melting point of 87–90° C.

Example IX

This example illustrates the actual use of our novel derivatives for the protection of various polymers against the degradative effects of ultra-violet radiation.

The procedure utilized in demonstrating the effectiveness of our derivatives as light stabilizing additives involved their being dissolved in samples of various polymer lacquers. Films having a wet thickness of 3 mils were thereupon cast from these lacquers onto glass plates. After being air dried, overnight, the thus coated plates were then exposed, for varying periods, at a distance of 2 feet from a mercury vapor photochemical lamp which was enclosed, together with the films, in a ventilated light proof cabinet. The relationship between outdoor sunlight and the ultra-violet radiation developed by this apparatus is such that 24 hours of exposure therein is equivalent to 30 days of outdoor exposure wherein each of said days provides 8 hours of sunlight.

As a control for these tests, comparable films were cast from samples of each of the same lacquers which, in this case, had not been formulated with any of our light stabilizing derivatives. These films were similarly exposed to the ultra-violet source and the results of these comparative tests are given in the table which is presented below wherein, for purposes of brevity, the derivatives utilized are referred to by the following designations:

Derivative #1—the maleic acid ester derivative of 2-hydroxy-4-(beta-hydroxyethoxy)benzophenone
Derivative #2—the trimellitic acid ester derivative of 2-hydroxy-4-(beta-hydroxyethoxy)benzophenone
Derivative #3—the succinic acid ester derivative of 2-hydroxy-4-(beta-hydroxyethoxy)benzophenone
Derivative #4—the succinic acid ester derivative of 2-hydroxy-4-(beta-hydroxypropoxy)benzophenone
Derivative #5—the succinic acid ester derivative of 2-hydroxy-4-(beta-hydroxybutoxy)benzophenone
Derivative #6—the succinic acid ester derivative of 2-hydroxy-4-(beta-hydroxyoctoxy)benzophenone
Derivative #7—the maleic acid ester derivative of 2-hydroxy-4-(beta-hydroxydodecoxy)benzophenone

| Polymer Lacquer | Derivative | Percent Derivative on Resin Solids | Time (hrs.) | Condition of Film |
|---|---|---|---|---|
| Polystyrene in toluene; 30% by wt., resin solids. | | | 16 | Turned yellow. |
| Do | #1 | 1.25 | 16 | Remained colorless. |
| Do | #2 | 1.25 | 16 | Do. |
| Do | #3 | 1.25 | 16 | Do. |
| A 75:25 vinylidene chloride:butyl acrylate copolymer in tetrahydrofuran; 25%, by wt., resin solids. | | | 2 | Turned brown and became brittle. |
| Do | #4 | 5.0 | 2 | Remained colorless and flexible. |
| Do | #5 | 5.0 | 2 | Do. |
| Do | #6 | 5.0 | 2 | Do. |
| A 90:10 vinyl chloride:vinyl acetate copolymer in tetrahydrofuran; 25%, by wt., resin solids. | | | 16 | Turned brown with many dark spots. |
| Do | #7 | 10.0 | 16 | Turned slightly tan. |

Summarizing, our invention is therefore seen to provide the practitioner with a novel class of benzophenone derivatives which are useful as ultra-violet absorbers for synthetic organic polymers. Variations may be made in proportions, procedures and materials without departing from the scope of our invention which is limited only by the following claims.

What is claimed is:

1. A carboxylic acid ester derivative of a $C_2$–$C_{18}$ beta-hydroxyalkoxy benzophenone ether which has a formula corresponding to one of the following:

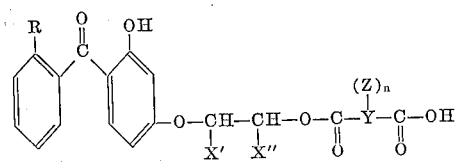

and

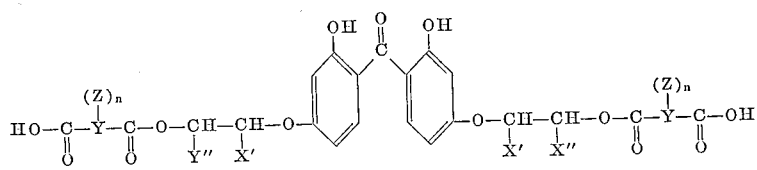

wherein:

Z represents a carboxy group;
wherein $n$ represents any integer from 0 to 2 inclusive;
wherein R represents a radical selected from the class consisting of hydrogen and hydroxy radicals;
wherein Y represents a radical selected from the class consisting of alkylene and alkene radicals having said attached carbonyl groups separated from one another by at least 2 and no more than 3 carbon atoms, and aromatic radicals selected from the class consisting of phenyl and naphthyl groups having said attached carbonyl groups substituted thereon in positions which are ortho with respect to one another; and,
wherein X' and X'' are radicals selected from the class consisting of hydrogen and alkyl radicals such that the sum total of carbon atoms in the equation X'+X''+2, when applied to one hydroxyalkoxy side chain moiety, equals any integer from 2 to 18 inclusive.

2. The water soluble salts of the derivatives of claim 1, wherein said salts are selected from the group consisting of the alkali salts and the alkyl amine salts of said derivatives.

3. The maleic acid ester derivative of 2-hydroxy-4-(beta-hydroxyethoxy)benzophenone corresponding to the formula:

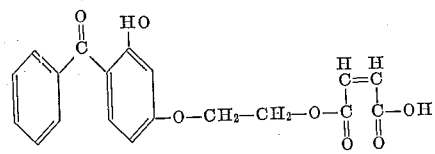

4. The trimellitic acid ester derivative of 2-hydroxy-4-(beta-hydroxyethoxy)benzophenone corresponding to the formula:

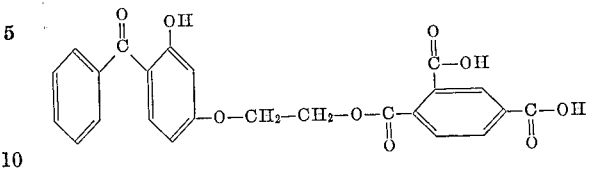

5. The succinic acid ester derivative of 2-hydroxy-4-(beta-hydroxyethoxy)benzophenone corresponding to the formula:

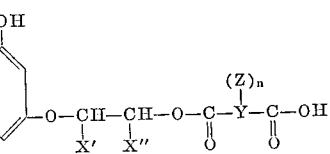

6. The succinic acid ester derivative of 2-hydroxy-4-(beta-hydroxypropoxy)benzophenone corresponding to the formula:

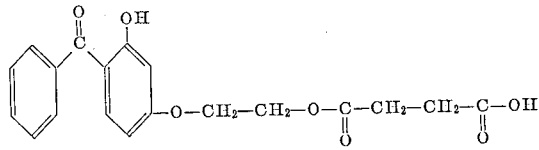

7. The succinic acid ester derivative of 2-hydroxy-4-(beta-hydroxybutoxy)benzophenone corresponding to the formula:

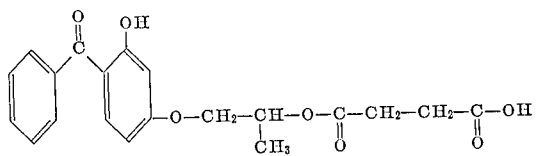

References Cited

Wagner et al.: Synthetic Organic Chemistry, John Wiley and Sons, N.Y., 1953, pages 482, 483.

LORRAINE A. WEINBERGER, *Primary Examiner.*

T. L. GALLOWAY, *Assistant Examiner.*